Nov. 17, 1964  D. J. KENNEDY ETAL  3,157,468
APPARATUS AND PROCESS FOR PRODUCTION OF HYDROGEN CYANIDE
Filed July 17, 1961
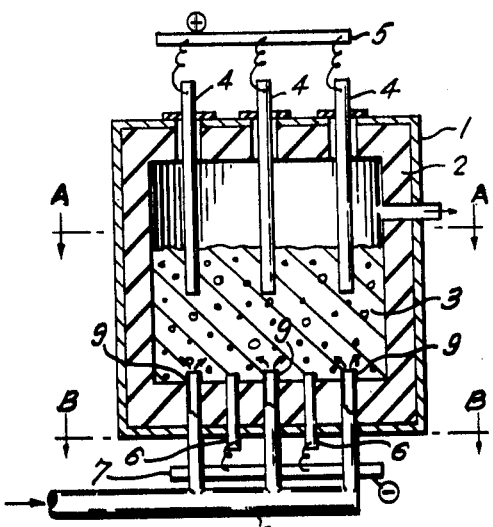
Fig_1
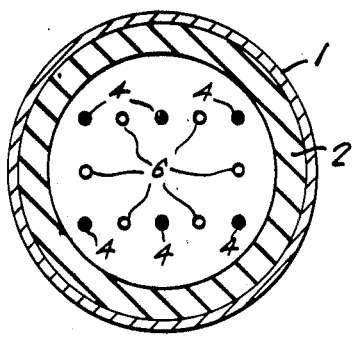
Fig_2
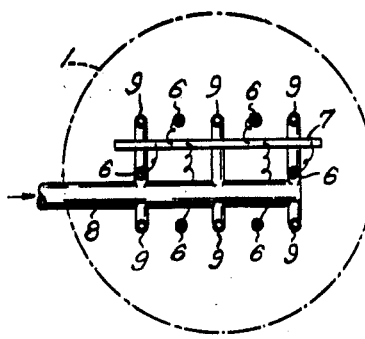
Fig_3
INVENTORS
Douglas J. KENNEDY
Noel B. SHINE
BY Heatley & Morrison
AGENTS United States Patent Office
3,157,468
Patented Nov. 17, 1964

3,157,468
APPARATUS AND PROCESS FOR PRODUCTION OF HYDROGEN CYANIDE
Douglas J. Kennedy, Shawinigan, Quebec, and Noel B. Shine, Shawinigan South, Quebec, Canada, assignors to Shawinigan Chemicals Limited, Montreal, Quebec, Canada, a corporation of Canada
Filed July 17, 1961, Ser. No. 124,372
5 Claims. (Cl. 23—151)

This invention relates to certain features of reactors or furnaces for carrying out chemical reactions in an electrically heated fluidized bed of carbon particles. More particularly, it relates to a reactor or furnace for the production of hydrogen cyanide from gas comprising ammonia, particularly mixtures of ammonia and hydrocarbon vapors, in a fluidized bed of electrically conductive carbon particles heated by the passage of electricity therethrough.

Examples of chemical reactions carried out in such electrically heated fluidized beds are the production of hydrogen cyanide from ammonia and carbon or hydrocarbons, and the production of carbon monoxide from carbon dioxide and the carbon particles of the fluidized bed.

In bench-scale apparatus there is little choice in the location of electrodes because of space limitations. However, in pilot plant and commercial equipment the designer has considerable scope for variation. For simplicity, it is preferable to use a bottom electrode making contact with the lower portion of the bed, and a single electrode extending downward through the cover of the structure to a point below the level of the top of the bed, thus making contact with the upper portion of the bed. For good fluidization, a number of gas inlets enter the bottom of the structure and are sufficient in number and are uniformly distributed so as to give an essentially uniform flow of gas over the whole cross section of the bed. Various designs of gas inlet may be used, for example that shown in U.S. Patent 2,856,264 or that shown in co-pending United States application of Douglas J. Kennedy Serial No. 10,333, filed February 23, 1960, and now abandoned.

We have now found that for the best yields of hydrogen cyanide from gas comprising ammonia, particularly mixtures of ammonia and hydrocarbon vapors in such reactors, it is necessary to have a top electrode corresponding to each gas inlet and located as nearly as possible directly over it. Bearing in mind that one of the distinctive features of fluidized beds is that the active movement of the particles tends to give uniform temperatures throughout the bed and uniform gas flow over each element of cross-sectional area of the bed, it is entirely unexpected that the correlation of number and position of gas inlets and top electrodes should improve results when conditions are otherwise the same.

The accompanying drawings illustrate an embodiment showing the features of the invention, FIG. 1 being an elevation, partly in section, FIG. 2 being a cross section of the apparatus of FIG. 1 at line A—A, and FIG. 3 being a cross section of the apparatus of FIG. 1 at line B—B.

The invention thus includes, in a reactor for producing hydrogen cyanide from a gas comprising ammonia, said reactor being a heat-insulated enclosure containing a bed of electrically conductive carbon particles adapted to be fluidized by the said gas, and said reactor having (a) at least one bottom electrode extending into the lower portion of said bed, (b) a plurality of gas inlets extending through the bottom of said reactor into the lower portion of said bed, and (c) at least one top electrode extending through the top of the said reactor to a point in the upper portion of the fluidized bed, the improvement which consists in a plurality of said top electrodes equal in number to the number of gas inlets and at a common electrical potential, each of said electrodes being vertically aligned substantially directly over a corresponding gas inlet. The invention further includes a process for producing hydrogen cyanide from gas comprising ammonia in a heat insulated enclosure containing a bed of electrically conductive carbon particles adapted to be fluidized by the said gas, comprising passing an electric current through the said bed between at least one bottom electrode which makes contact with the lower portion of the bed and a plurality of top electrodes each making contact with the upper portion of the bed, while simultaneously passing a stream of said gas upwardly into said bed through a plurality of gas inlets in the bottom of the bed corresponding in number to the number of top electrodes, with each gas inlet admitting said gas to said bed directly under a corresponding top electrode.

In the drawings, FIG. 1 shows a reactor having a steel shell 1 and a heat insulating lining 2 holding a bed of fluidized particles 3. Six top entering electrodes 4 are connected to a common bus bar 5, three of the electrodes being shown and the other three hidden in the view shown in FIG. 1, but all six being shown (in cross section) in FIG. 2. Opposed to the top entering electrodes are six bottom entering electrodes 6, only two of which show in FIG. 1, but all six of which are visible in FIG. 2. The bottom electrodes are connected to a common bus bar 7. A gas manifold 8 brings reaction gas to the reactor and distributes it among the six gas inlets 9, each of which is located directly beneath a corresponding top electrode; only three of the inlets appear in FIG. 1 but all six appear in FIG. 3 in their respective positions relative to their respective corresponding top entering electrodes 4.

The following examples illustrate the invention.

*Example 1*

The furnace was a vertical steel cylinder lined with refractory brick to give an internal diameter of 30 cm. Fluid petroleum coke (i.e., petroleum coke made in a fluid coking process) was added to the reactor to give a depth of bed, when fluidized, of about 30 cm. The gas inlet, a particular device as described in aforementioned co-pending application Serial No. 10,333, filed February 23, 1960, was located in the centre of the bottom. Electrical contact with this bed was made by four graphite electrodes 25–30 mm. in diameter projecting through the bottom heat insulation around the gas inlet. A single graphite electrode, 75 mm. in diameter, projected through the closed roof and penetrated about 25 mm. into the fluidized bed at its lowest level. The gas outlet was a horizontal refractory tube extending through the refractory wall at a height of about 120 cm. above the top of the fluidized bed. Alternating current at sixty cycles/second was supplied from the secondary of a transformer at 220 volts, and a saturable-core reactance was connected between the transformer and the furnace to provide power control.

During a period of twenty-four hours the furnace was operated at an apparent furnace voltage of 202 volts and an apparent current of 375 amperes, which maintained a temperature at the periphery of the bed, observed through an observatoin port in the wall of the furnace, of about 1430° C. The gas feed was a mixture of ammonia, commercial propane (containing 0 to 11% propylene), and hydrogen, with volume ratios of ammonia to propane at 3.3 and of hydrogen to ammonia at 0.9. The superficial gas velocity was 25 cm. per second, this quantity being defined as the velocity of the feed gas through the furnace, adjustment being made for the temperature observed at the periphery of the bed, but not for any change in volume of the gas due to reaction nor for the volume of the coke particles of the bed, and excluding the diluent hydrogen from the calculation. The concentration of hydrogen cyanide in the product gas was determined by gas analysis of samples at irregular intervals, and averaged 19.6%, the variations being less than 0.5%.

Since practically no ammonia passes through the reactor unchanged and since the calculated volume of the product gas from a given feed is the same regardless of whether the ammonia reacts to hydrogen cyanide or decomposes to nitrogen and hydrogen, the yield of hydrogen cyanide based on ammonia can be calculated from the concentration. In this example the yield was 80.6%.

*Example 2*

PART A

The furnace was of the same general design as that used in Example 1, except that its internal diameter was 50 cm., there were three bottom electrodes of graphite 50 mm. in diameter to make contact with the bed, the depth of the fluidized bed was 30 cm. and in addition to the central gas inlet, there were three other gas inlets of the same design located symmetrically with their centres on a circle of 44 cm. diameter.

During a period of sixty four and one-half hours the furnace was operated at an apparent furnace voltage of 155 volts and an apparent current of 1100 amperes, i.e., 160 apparent kva., which maintained an observed temperature at the periphery of the bed of about 1440° C. The actual power input, as measured by a kilowatt hour meter, was 130 kilowatts, the discrepancy between the apparent kva. and the true kilowatts (power) being due to discontinuities in the furnace current. The feed gases were the same as those used in Example 1, and the mole ratios were almost the same, being 3.08 for ammonia/propane and 0.65 for hydrogen/ammonia. The superficial gas velocity was 25 cm. per second. The average concentration of hydrogen cyanide in the product gas, determined as in Example 1, was 17.5%, corresponding to a yield on ammonia of 71.4%.

PART B

The furnace was that used in Part A of this example except that the cover with one electrode was replaced by another with three graphite electrodes, each 75 mm. in diameter, connected to a common power cable, and located symmetrically with their centres on a circle of 154 mm. diameter and vertically above the line joining the centres of the gas inlets to the central axis of the reactor, i.e., each almost directly above a corresponding gas inlet. The central gas inlet used in Part A of the Example 2 was closed for this part of the example.

During a period of sixteen hours, the furnace was operated at an apparent furnace voltage of 150 volts and an average current of 1260 amperes, i.e., ostensibly 189 kva. but actually at lower power as in the previous part of this example, which maintained an observed temperature at the periphery of the bed of about 1435° C. The feed gases were the same as those used in Example 1; the mole ratios were almost the same, being 3.12 for ammonia/propane and 0.76 for hydrogen/ammonia. The superficial gas velocity was 25 cm. per second. The concentration of hydrogen cyanide in the product gas, determined as in Example 1, was 19.7%, corresponding to a yield on ammonia of 79.6%.

*Example 3*

This example is taken from the operation of the first commercial furnace for the production of hydrocyanic acid by the reaction of ammonia and hydrocarbon gas (commercial propane) in an electrically heated fluidized bed. The furnace held a fluidized bed 150 cm. in diameter in a reaction chamber about 150 cm. high, the bed being about 30 cm. deep at rest. The ammonia and propane feeds to the fluidized bed, together with a stream of recycled by-product hydrogen, were mixed and fed through the bottom of the reactor to the fluidized bed via sixteen individually flow controlled gas inlets, spaced about 25 cm. apart, of the same design as those used in the preceding examples, connected in parallel and set in four parallel rows across the reactor, with three inlets each in the two outer rows and five inlets each in the two center rows. This system of gas inlets and controls provided adequately uniform distribution of fluidizing gas across the whole fluidized bed. Sixteen electrodes, each about 8 cm. in diameter and suspended from the roof of the furnace and electrically insulated therefrom, penetrated the fluidized bed from above; they were positioned so that each one was located vertically directly above a corresponding gas inlet. Bottom electrodes entered the fluidized bed between the gas inlets to complete the electrical circuit of the furnace through the fluidized bed, the vertical distance between the ends of the top and bottom electrodes in the bed being about 30 cm.

During a specific trial period, 31,150 kg. vaporized ammonia was fed to the furnace at a rate between about 226.5 and 254.5 cubic meters per hour; 25,950 kg. vaporized propane was fed at the same time at a rate between about 76.5 and 89.5 cubic meters per hour, the mold ratio of ammonia to propane being between 2.96 and 3.1 to 1.0. At the same time the flow of recycle hydrogen mixed with these vapors for feed to the furnace was maintained between about 340 and 396.5 cubic meters per hour to provide a mole ratio of hydrogen to ammonia in the feed between 1.5 and 1.7 to 1.0. Voltage applied to the furnace electrodes during the trial was between 215 and 250 volts; this maintained a current between about 5000 and 7000 amps. through the bed and kept the observed temperature at the periphery of the bed in the range 1460 to 1490° C. The hydrocyanic acid formed in the furnace was absorbed from the effluent gases in aqueous sodium hydroxide solution to form an aqueous sodium cyanide solution, and the yield of product, based on the raw materials used, was calculated from measurement of the amount and concentration of sodium cyanide solution obtained. The 77,100 kg. (dry weight) of sodium cyanide obtained indicated that yields of 86.0% based on the ammonia used, and 86.4% based on the propane used, were obtained.

The operating conditions shown in the foregoing examples were closely similar, except in one respect. In Example 1, in Part B of Example 2, and in Example 3, there were equal numbers of top electrodes and gas inlets, the former being directly over the latter or nearly so. On the other hand, in Example 2, Part A, there were four gas inlets and only one electrode so that only one-quarter of the gas flow entered the reactor directly under an electrode. Example 1, Part B of Example 2, and Example 3, gave yields of hydrogen cyanide on ammonia of 80–86% whereas Example 2 gave a yield of only 71%, a surprising and unexpected difference when it is considered in the light of the uniformity of conditions, particularly temperature, usually assumed to exist in fluidized beds. Example 3 illustrates the particularly superior yields (86%) that are achieved in the process when multiple gas inlets and associated multiple electrodes are used to ensure efficient distribution of gas into the fluidized bed in the direct path of electrical current between electrodes disposed in the upper and lower portions of the fluidized bed.

Although applicants are not committed to any explanation of any mechanism by which the improved apparatus and process claimed herein produces superior yields of hydrogen cyanide, it is believed (1) that significant temperature differences do occur in fluidized beds electrically heated as described above, and (2) that significantly higher temperatures exist in the vicinity of the electrodes in such beds; it is further believed that (1) a more favorable condition for the reactions for the formation of hydrogen cyanide from ammonia exists in the vicinity of the electrodes in these electrically heated fluidized beds, and (2) that maximum utilization of the favorable condition is achieved with the expedients claimed herein.

As is well known in the art, numerous modifications can be made in the specific expedients described. For example, the process for producing hydrogen cyanide can be carried out by reacting ammonia with carbon in the fluidized bed of the reactor, or by reacting ammonia with hydrocarbons other than the propane illustrated in the examples, e.g. methane, natural gas, light naphtha hydrocarbons, benzene, and xylene. Each reaction can be carried out at the temperature most propitious for the specific reaction, the temperature being regulated by controlling the electrical power input to the reactor. The various other conditions of the reactions can also be modified as is well known in the art.

Numerous other modifications may be made in the specific expedients described without departing from the spirit of the invention as defined in the following claims.

What is claimed is:

1. In a reactor for producing hydrogen cyanide from a gas comprising ammonia, said reactor being a heat-insulated enclosure containing a bed of electrically conductive carbon particles adapted to be fluidized by the said gas, and said reactor having (a) at least one bottom electrode extending into the lower portion of said bed, (b) a plurality of gas inlets extending through the bottom of said reactor into the lower portion of said bed, and (c) at least one top electrode extending through the top of the said reactor to a point in the upper portion of the fluidized bed, the improvement which consists in a plurality of said top electrodes equal in number to the number of gas inlets and at a common electrical potential, each of said electrodes being vertically aligned substantially directly over a corresponding gas inlet.

2. A reactor for producing hydrogen cyanide from a gas comprising ammonia, said reactor having (1) a heat insulated enclosure containing a bed of electrically conductive carbon particles adapted to be fluidized by the said gas, (2) at least one bottom electrode extending into the lower portion of said bed, (3) a plurality of gas inlets extending through the bottom of said enclosure into the lower portion of said bed, characterized by a plurality of top electrodes at a common electrical potential, said electrodes extending down through the top of the said enclosure into the upper portion of said bed and being equal in number to the number of gas inlets, each of said electrodes being vertically aligned substantially directly over a corresponding gas inlet.

3. A process for producing hydrogen cyanide from a gas comprising ammonia in a heat insulated enclosure containing a bed of electrically conductive carbon particles adapted to be fluidized by the said gas, comprising passing an electric current through the said bed between at least one bottom electrode which makes contact with the lower portion of the bed and a plurality of top electrodes each making contact with the upper portion of the bed, while simultaneously passing a stream of said gas upwardly into said bed through a plurality of gas inlets in the bottom of the bed corresponding in number to the number of top electrodes, with each gas inlet admitting said gas to said bed directly under a corresponding top electrode.

4. A process as claimed in claim 3 wherein said gas comprises a mixture of ammonia, hydrocarbon vapor, and hydrogen.

5. A process as claimed in claim 4 wherein said hydrocarbon is propane.

References Cited in the file of this patent

UNITED STATES PATENTS

| | | |
|---|---|---|
| 2,799,640 | Pevere et al. | July 16, 1957 |
| 2,958,584 | Johnson et al. | Nov. 1, 1960 |